US012183251B2

(12) United States Patent
Ma et al.

(10) Patent No.: US 12,183,251 B2
(45) Date of Patent: Dec. 31, 2024

(54) DISPLAY DRIVER INTEGRATED CIRCUIT AND DISPLAY DRIVING METHOD FOR GENERATING CLOCK PATTERN

(71) Applicant: Novatek Microelectronics Corp., Hsinchu (TW)

(72) Inventors: Wei-Jhe Ma, Taichung (TW); Feng-Ting Pai, Hsinchu (TW); Hui-Hung Chang, Keelung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/701,675

(22) Filed: Mar. 23, 2022

(65) Prior Publication Data

US 2022/0309993 A1 Sep. 29, 2022

Related U.S. Application Data

(60) Provisional application No. 63/165,097, filed on Mar. 23, 2021.

(51) Int. Cl.
*G09G 3/20* (2006.01)

(52) U.S. Cl.
CPC ... *G09G 3/2092* (2013.01); *G09G 2310/0275* (2013.01); *G09G 2310/08* (2013.01); *G09G 2320/0271* (2013.01)

(58) Field of Classification Search
None
See application file for complete search history.

(56) References Cited

U.S. PATENT DOCUMENTS

| | | | | |
|---|---|---|---|---|
| 9,874,857 | B1 | 1/2018 | Keizer | |
| 10,908,559 | B1 | 2/2021 | Guzman et al. | |
| 2006/0005114 | A1* | 1/2006 | Williamson | G06T 11/20 345/419 |
| 2016/0133231 | A1* | 5/2016 | Liu | G09G 5/14 345/205 |
| 2016/0274738 | A1 | 9/2016 | Hsiao et al. | |

(Continued)

FOREIGN PATENT DOCUMENTS

| | | |
|---|---|---|
| TW | 201915996 | 4/2019 |

OTHER PUBLICATIONS

"Office Action of Taiwan Counterpart Application", issued on Jan. 18, 2023, p. 1-p. 8.

*Primary Examiner* — Amr A Awad
*Assistant Examiner* — Donna V Bocar
(74) *Attorney, Agent, or Firm* — JCIPRNET

(57) ABSTRACT

A display driver integrated circuit and a display driving method are provided. The display driver integrated circuit is suitable for driving a display panel of an electronic device. The display driver integrated circuit includes an image processing circuit, a timing controller, and a data driving circuit. The image processing circuit is configured to generate an output image based on time information, a background image, and an original time indication image. The timing controller is coupled to the image processing circuit, and configured to receive the output image. The data driving circuit is coupled to the timing controller, and configured to receive the output image and generate data voltages according to the output image. The data driving circuit drives the display panel according to the data voltages regarding to the output image.

16 Claims, 8 Drawing Sheets

(56) References Cited

U.S. PATENT DOCUMENTS

| | | | |
|---|---|---|---|
| 2017/0003710 A1 | 1/2017 | MacWilliams et al. | |
| 2018/0061308 A1* | 3/2018 | Bae | G09G 3/2096 |
| 2020/0066202 A1 | 2/2020 | Bae et al. | |

* cited by examiner

DISPLAY DRIVER INTEGRATED CIRCUIT AND DISPLAY DRIVING METHOD FOR GENERATING CLOCK PATTERN

CROSS-REFERENCE TO RELATED APPLICATION

This application claims the priority benefit of U.S. Provisional Application No. 63/165,097, filed on Mar. 23, 2021. The entirety of the above-mentioned patent application is hereby incorporated by reference herein and made a part of this specification.

BACKGROUND

Technical Field

The disclosure generally relates to a driver circuit, in particular, to a display driver integrated circuit and a display driving method.

Description of Related Art

The conventional image driving method for providing real-time time information should process a large amount of image data. Especially when a central processing unit of an electronic device is operated in a sleep mode or a power saving mode, the display driver continues to consume more power to process the large amount of image data, so the electronic device still consumes more power during the period of the sleep mode or the power saving mode. Moreover, since the electronic device or the display driver has higher data storage space requirements, so the cost of the electronic device or the display driver cannot be effectively reduced.

SUMMARY

The disclosure is directed to a display driver integrated circuit and a display driving method capable of providing effective display driving function.

The display driver integrated circuit of an embodiment of the disclosure includes an image processing circuit, a timing controller, and a data driving circuit. The display driver integrated circuit is suitable for driving a display panel of an electronic device. The image processing circuit is configured to generate an output image based on time information, a background image, and an original time indication image. The timing controller is coupled to the image processing circuit. The timing controller is configured to receive the output image and generate a processed output image. The data driving circuit is coupled to the timing controller. The data driving circuit is configured to receive the processed output image and generate data voltages according to the processed output image. The data driving circuit drives the display panel according to the data voltages.

The display driving method for driving a display panel of an electronic device of an embodiment of the disclosure includes the following steps: generating an output image based on time information, a background image, and an original time indication image by an image processing circuit; receiving the output image and generating a processed output image by a timing controller; receiving the processed output image and generate data voltages according to the processed output image by a data driving circuit; and driving the display panel according to the data voltages by the data driving circuit.

Based on the above, according to the display driver integrated circuit and the display driving method of the disclosure, the display driver integrated circuit and the display driving method can generate various display effects with a lower amount of display data.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

It is to be understood that other embodiments may be utilized and structural changes may be made without departing from the scope of the disclosure. Also, it is to be understood that the phraseology and terminology used herein are for the purpose of description and should not be regarded as limiting. The use of “including,” “comprising,” or “having” and variations thereof herein is meant to encompass the items listed thereafter and equivalents thereof as well as additional items. Unless limited otherwise, the terms “connected,” “coupled,” and “mounted,” and variations thereof herein are used broadly and encompass direct and indirect connections, couplings, and mountings.

Figure 1:
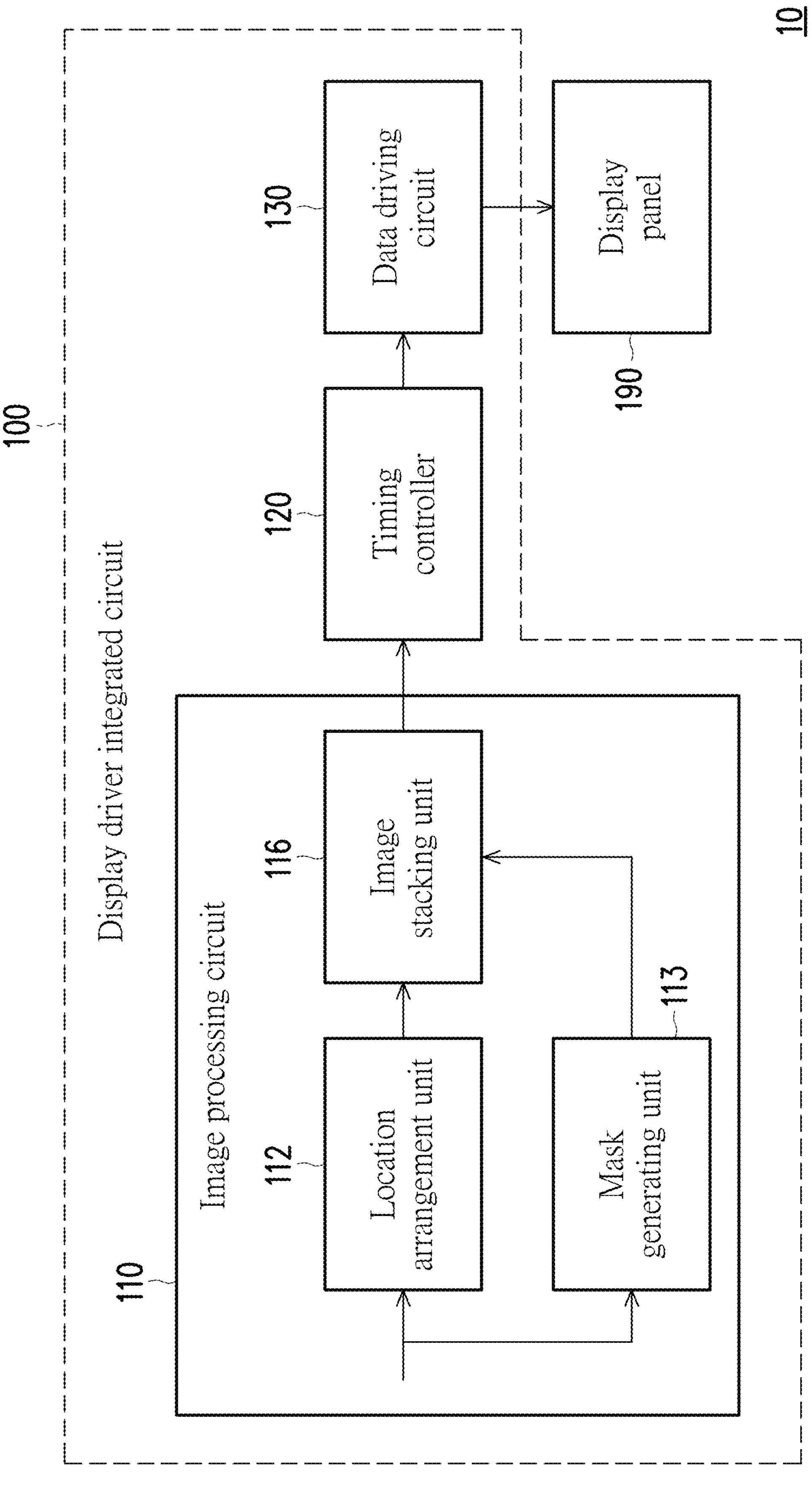
FIG. 1 is a schematic diagram of a display driver integrated circuit according to an embodiment of the disclosure.

FIG. 1 is a schematic diagram of an electronic device according to an embodiment of the disclosure. Referring to FIG. 1, the electronic device 10 includes a display driver integrated circuit 100 and a display panel 190. The display driver integrated circuit 100 is coupled to the display panel 190, and is configured to drive the display panel 190. The display driver integrated circuit 100 includes an image processing circuit 110, a timing controller 120, and a data driving circuit 130. The image processing circuit 110 is coupled to the timing controller 120, and is configured to generate an output image based on time information, a background image, and an original time indication image. The timing controller 120 is further coupled to the data driving circuit 130, and is configured to receive the output image and generate a processed output image based on the output image, and provide the processed output image and related driving control signals to the data driving circuit 130. The data driving circuit 130 is further coupled to the display panel 190, and is configured to generate data voltages according to the processed output image and related driving control signals, so as to drive the display panel 190 by the data voltages. In the embodiment, the original time indication image is used for indicating hour information, minute information or second information, such as an hour hand image, a minute hand image or a second hand image, and the word 'original' means it is an image not being through any image process such as scaling or clipping. The background image may be an analog clock pattern such as including numbers 1 to 12 clockwise arranged. However, in another embodiment of the disclosure, the background image may also be other patterns, and original time indication image may be a pattern with digital clock number.

In the embodiment of the disclosure, the electronic device 10 may be a display device, but the disclosure is not limited thereto. In the embodiment of the disclosure, the display driver integrated circuit 100 may be a display driver integration chip, and may also integrate other circuits, such as a touch driving circuit and/or a fingerprint sensing circuit. In the embodiment of the disclosure, the display panel 190 may be a light-emitting diode (LED) display panel, a micro LED display panel, an organic light-emitting diode (OLED) display panel, a liquid-crystal display (LCD) panel or other types of display panels, and includes a plurality of pixel units arranged in an array.

In the embodiment of the disclosure, the image processing circuit 110 includes a location arrangement unit 112, a mask generating unit 113, and an image stacking unit 116. The image stacking unit 116 is coupled to the location arrangement unit 112 and the mask generating unit 113. In the embodiment of the disclosure, the location arrangement unit 112 may obtain the original time indication image and the background image from a frame buffer, and the mask generating unit 113 may obtain the original time indication image from the frame buffer. In the embodiment of the disclosure, the location arrangement unit 112 may be used to transform coordinates of a reference point in a first input image which is input to the location arrangement unit 112 to coordinates of an image stacking location in the background image. The mask generating unit 113 may generate a mask image according to a second input image which is input to the mask generating unit. The image stacking unit 116 may process a third input image which is input to the image stacking unit by using the mask image to generate a processed input image, and stack the processed input image on the background image to generate the output image according to the coordinates of the image stacking location. In the embodiment of the disclosure, the first input image and the second input image may be the same as the original time indication image or a scaled time indication image, and corresponding to the time information.

In the embodiment of the disclosure, the image processing circuit 110 may generate the output image with time indication information by stacking the time indication image and the background image. The image processing circuit 110 may use fewer image data than storing multiple complete output images with different variations over time. Therefore, the electronic device 10 or the display driver integrated circuit 100 can have lower data storage space requirements, and can provide can effectively drive the display panel 190 to display an image screen with time information.

Figure 2:
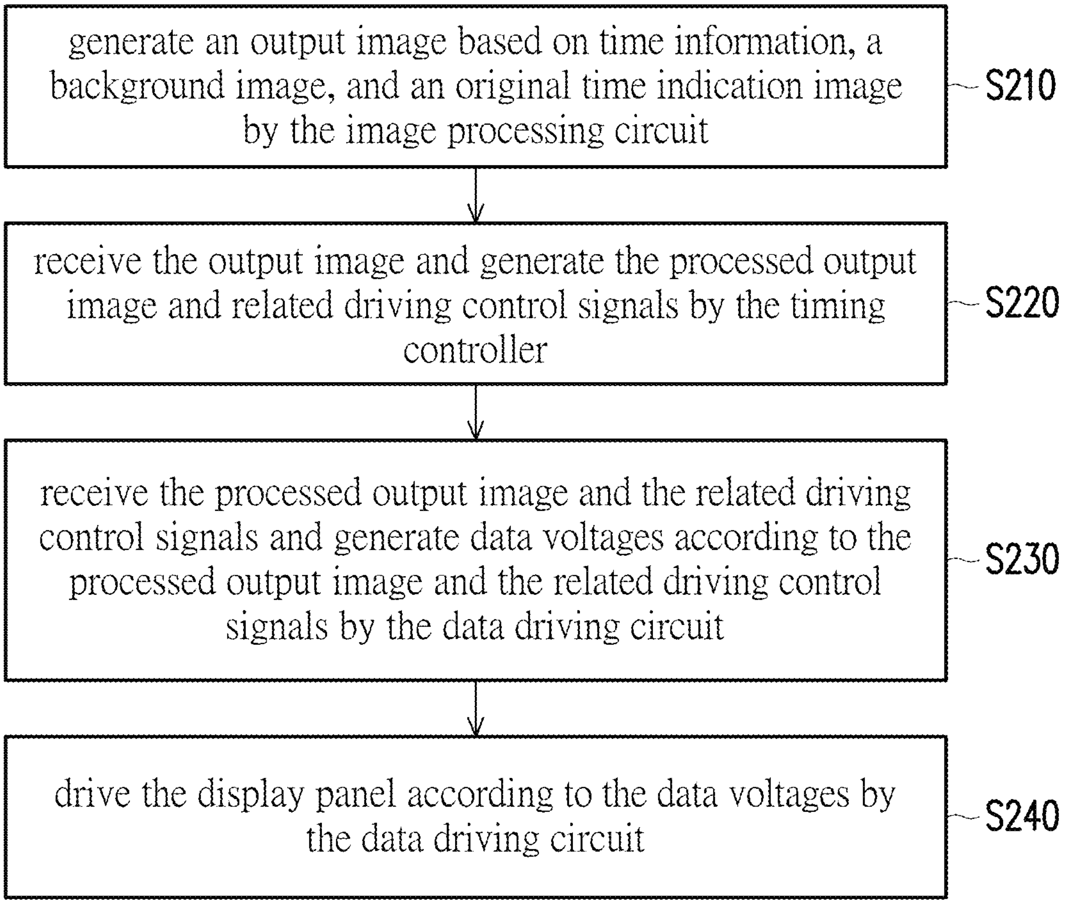
FIG. 2 is a flowchart of a display driving method according to an embodiment of the disclosure.

FIG. 2 is a flowchart of a display driving method according to an embodiment of the disclosure. Referring to FIG. 1 and FIG. 2, the display driving method of the embodiment may be adapted to the display driver integrated circuit 100 of FIG. 1. Moreover, in one embodiment of the disclosure, the display driving method of the embodiment may also be adapted to the display driver integrated circuit 300 of FIG. 3. However, the following description uses the display driver integrated circuit 100 of FIG. 1 as an example. In step S210, the image processing circuit 110 generates the output image based on time information, the background image, and the original time indication image. In step S220, the timing controller 120 receives the output image and generates the processed output image and related driving control signals. In step S230, the data driving circuit 130 receives the processed output image and the related driving control signals and generates data voltages according to the processed output image and the related driving control signals. In step S240, the data driving circuit 130 drives the display panel 190 according to the data voltages. Therefore, the display driver integrated circuit 100 can effectively drive the display panel 190 to display an image with time information. In addition, the relevant circuit features, implementation details, and related technical features of the display driver integrated circuit 100 may obtain sufficient teachings, suggestions, and implementation descriptions based on the description of the above-mentioned embodiment of FIG. 1, and there will not repeat again.

Figure 3:
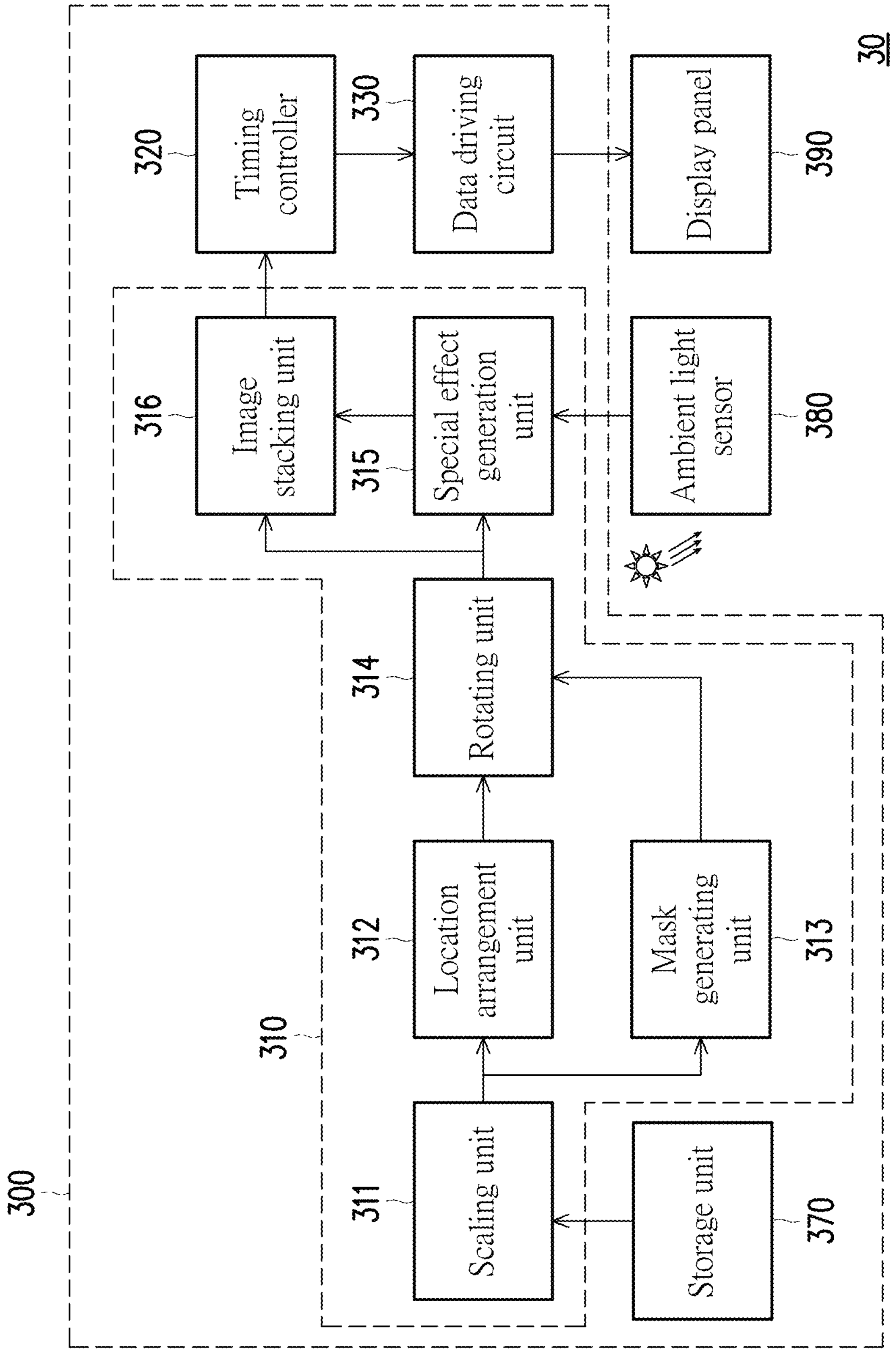
FIG. 3 is a schematic diagram of a display driver integrated circuit according to another embodiment of the disclosure.

FIG. 3 is a schematic diagram of a display driver integrated circuit according to another embodiment of the disclosure. Referring to FIG. 3, the electronic device 30 includes a display driver integrated circuit 300, an ambient light sensor 380, and a display panel 390. The display driver integrated circuit 300 is coupled to the ambient light sensor 380, and the display panel 390, and is configured to drive the display panel 390. The display driver integrated circuit 300 includes an image processing circuit 310, a timing controller 320, a data driving circuit 330 and a storage unit 370. The image processing circuit 310 is coupled to the timing controller 320, the storage unit 370, and an ambient light sensor 380. The timing controller 320 is further coupled to the data driving circuit 330. The data driving circuit 330 is further coupled to the display panel 390. It should be noted that, the display driver integrated circuit 300 may coupled to a central processing unit of the electronic device 30, and the image processing circuit 300 generates the output image when the central processing unit of the electronic device 30 is operated in a sleep mode or a power saving mode.

In the embodiment of the disclosure, the image processing circuit 310 includes a scaling unit 311, a location arrangement unit 312, a mask generating unit 313, a rotating unit 314, a special effect generation unit 315, and an image stacking unit 316. The scaling unit 311 is coupled to the storage unit 370, the location arrangement unit 312 and the mask generating unit 313. The rotating unit 314 is coupled to the location arrangement unit 312, the mask generating unit 313, the special effect generation unit 315, and the image stacking unit 316. The special effect generation unit 315 is further coupled to the image stacking unit 316 and the ambient light sensor 380. The image stacking unit 316 is coupled to the timing controller 320.

In the embodiment of the disclosure, the storage unit 370 may be a frame buffer in the display driver integrated circuit 300, but the disclosure is not limited thereto. In another embodiment of the disclosure, an external memory device outside the display driver integrated circuit 300 of the electronic device 30 may be used for acting the similar function of the storage unit 370 in the disclosure. In the embodiment of the disclosure, the storage unit 370 may store at least one time indication image and a background image for the image processing circuit 310 to read, and the scaling unit 311 may obtain an original time indication image by accessing the storage unit 370. The scaling unit 311 may change an image size of the original time indication image to generate the scaled time indication image. In one embodiment of the disclosure, the scaling unit 311 may perform an affine transformation on the original time indication image to change the image size of the original time indication image, so as to generate a scaled time indication image. In other words, the storage unit 370 may storage the original time indication image with a lower amount of data. Moreover, the image size corresponding to the data amount of the original time indication image stored in the storage unit may be lower than the actual image size to be displayed by display panel 390. In addition, the scaling unit 311 may be used to change an image size of the background image to generate the scaled background image.

In the embodiment of the disclosure, the location arrangement unit 312 may receive the scaled time indication image (the first input image) and the background image from the scaling unit 311, and may determine the position of the scaled time indication image in the background image. The location arrangement unit 312 may transform coordinates of a reference point in the scaled time indication image to coordinates of an image stacking location in the background image. The coordinate transformation is performed since the image size (width*height by pixels) of the scaled time indication image may be different from the image size of the background image. For example, the image size of a scaled minute hand image is 32 pixel (width)*240 pixel (height) and the image size of a background image is 480 pixel (width)*480 pixel (height), and the coordinate transformation is required since the coordinates (Xh, Yh) of a reference point of the scaled minute hand mage has to be transformed to be coordinates (Xb, Yb) of the center of the background image. The image stacking location may be a preset location. In the embodiment of the disclosure, the mask generating unit 313 may receive the scaled time indication image (the second input image) from the scaling unit 311, and may generate a mask image according to the scaled time indication image.

In the embodiment of the disclosure, the rotating unit 314 may receive the coordinate transformed time indication image from the location arrangement unit 312 and the background image, and receive the mask image from the mask generating unit 313. Moreover, the rotating unit 314 may further receive time information from a central processing unit of the electronic device 30. The time information may be used to represent real-time time information such as 7:30 AM or 7:30:22 AM. The coordinate transformed time indication image may be a clock hand image such as an hour hand image, a minute hand image or, a second hand image, and the clock hand pattern in the coordinate transformed time indication image may be rotated by the rotating unit 314 by a rotation angle corresponding to the current time information to point to a direction regarding to the current time. In the embodiment of the disclosure, the rotating unit 314 may rotate the coordinate transformed time indication image by a rotation angle corresponding to the time information to generate a rotated time indication image and also rotate the mask image by the same rotation angle corresponding to the time information to generate a rotated mask image, so that the clock hand pattern in the rotated time indication image may be point to a specific direction corresponding to the time information (current time). In one embodiment of the disclosure, the rotating unit 314 may determine the rotation angle through a look-up table, but the disclosure is not limited thereto. For example, if the current time is 00:00 AM, the (scaled) hour hand image and the (scaled) minute hang image may be rotated zero degree and if the current time is 7:30 AM, the hour hand image may be rotated 195 degrees clockwise and the minute hand image may be rotated 180 degrees clockwise.

In the embodiment of the disclosure, the special effect generation unit 315 generate a shadow image output to the image stacking unit 316 according to the rotated time indication image. The special effect generation unit 315 may determine a transparency of the shadow image according to ambient light information, and determine a displacement between the shadow image and the rotated time indication image according to the time information. In the embodiment of the disclosure, the special effect generation unit 315 may receive the ambient light information from the ambient light sensor 380. Thus, the special effect generation unit 315 may generate the shadow image that mimic actual shadow changes.

In the embodiment of the disclosure, the image stacking unit 316 may receive the rotated time indication image (third input image) and the rotated mask image from the rotating unit 314, the background image, and the shadow image from the special effect generation unit 315. The image stacking unit 316 may process the rotated time indication image by using the rotated mask image to generate a processed time indication image, and stack the processed time indication image and the shadow image on the background image to generate an output image with real-time time information according to the coordinates of the image stacking location.

Therefore, when the central processing unit of the electronic device 30 is operated in the sleep mode or the power saving mode, the display driver integrated circuit 300 may read at least ones original time indication image having the clock hand pattern which is not associated with real-time time information, and the background image from the storage unit 370 at one time, and rotate the original time indication image based on real-time time information to generate the output image with real-time time information, for example, periodically generating such as generating in every second, every minute, or every hour. Therefore, the electronic device 30 or the display driver integrated circuit 300 can have lower data storage space requirements, and can provide can effectively drive the display panel 390 to display an image screen with time information when the central processing unit of the electronic device 30 is operated in the sleep mode or the power saving mode.

Figure 4C:
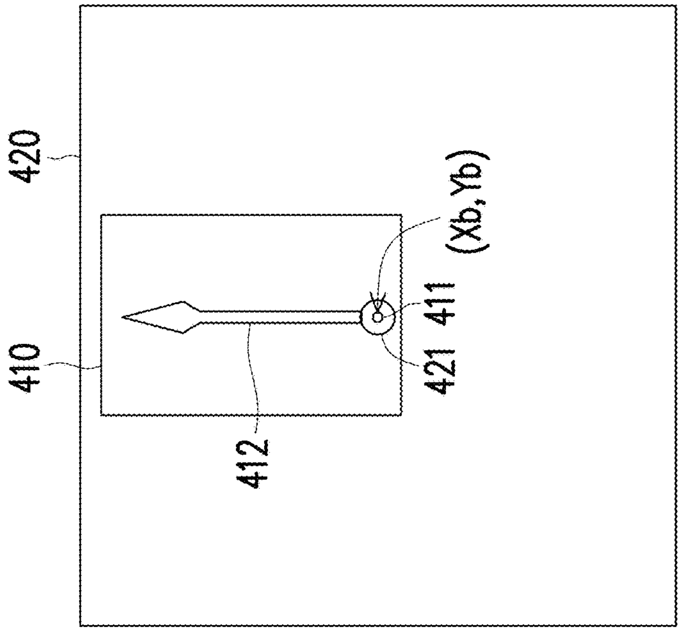
FIG. 4C is a schematic diagram of an output image according to an embodiment of the disclosure.
Figure 4B:
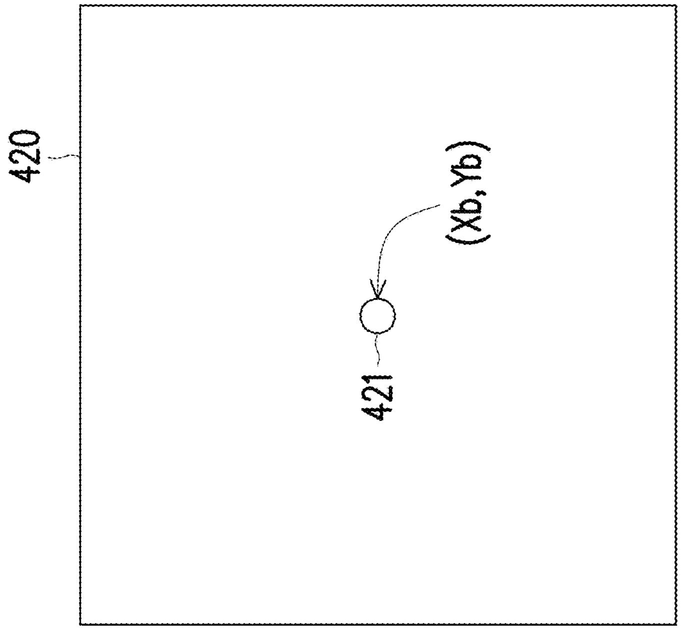
FIG. 4B is a schematic diagram of a background image according to an embodiment of the disclosure.
Figure 4A:
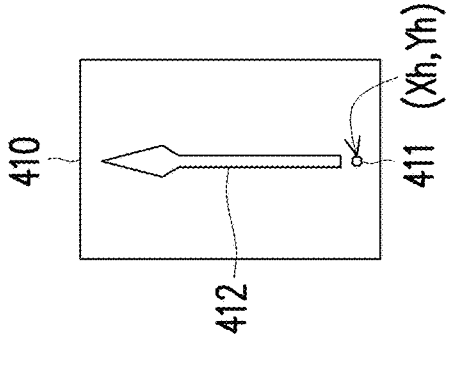
FIG. 4A is a schematic diagram of a time indication image according to an embodiment of the disclosure.

FIG. 4A is a schematic diagram of a time indication image according to an embodiment of the disclosure. FIG. 4B is a schematic diagram of a background image according to an embodiment of the disclosure. FIG. 4C is a schematic diagram of an output image according to an embodiment of the disclosure. Referring to FIG. 3 and FIG. 4A to 4C, the location arrangement unit 312 may obtain the time indication image 410 as shown in FIG. 4A, and obtain the background image 420. The time indication image 410 may be an original time indication image or a scaled time indication image. The time indication image 410 may include clock hand pattern 412 and a reference point 411 (hand center). The background image 420 may include a reference point 421 with a coordinate of the image stacking location. The reference point 421 may be a background center, but the disclosure is not limited thereto. In the embodiment of the disclosure, The coordinate of the reference point 411 (Xh, Yh) of the time indication image 410 may be transformed to be the reference point 421 (Xb, Yb) of the background image 420 represented in the background image 420, and provide the transformed reference point coordinate information to the image stacking unit 316. Hence, assuming no image rotation and no special effects, the image stacking unit 316 may stack the time indication image 410 on the background image 420 according to the coordinate of the image stacking location of the reference point 421 to generate an output image as shown in FIG. 4C. In FIG. 4C, the reference point 411 and the reference point 421 are superimposed, so that the clock hand pattern 412 can be can be displayed in the correct position in the output image.

Figure 5B:
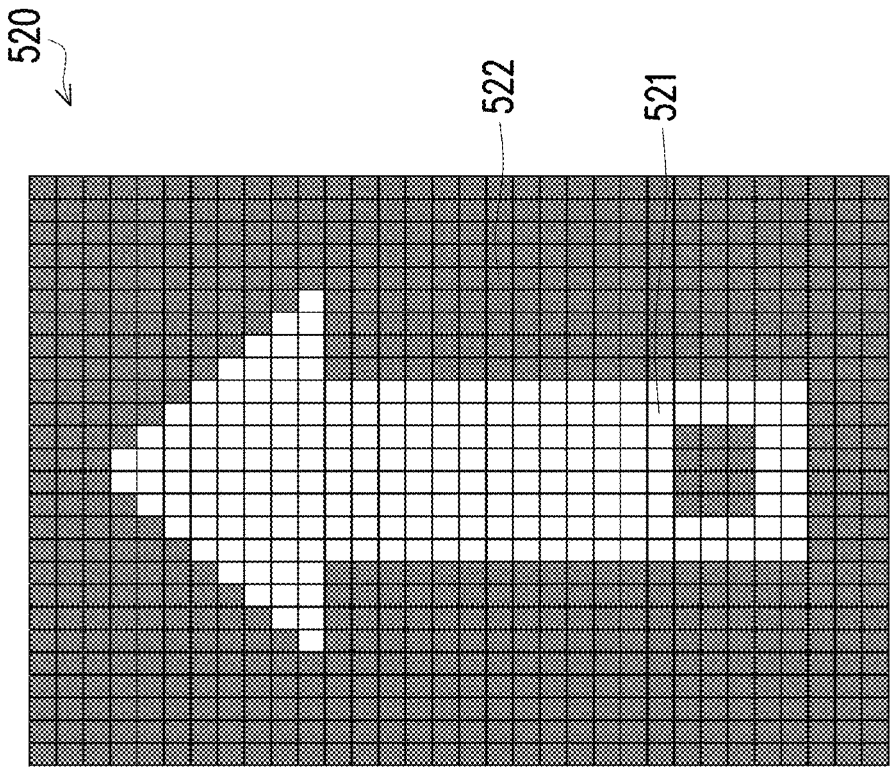
FIG. 5B is a schematic diagram of a mask image according to an embodiment of the disclosure.
Figure 5A:
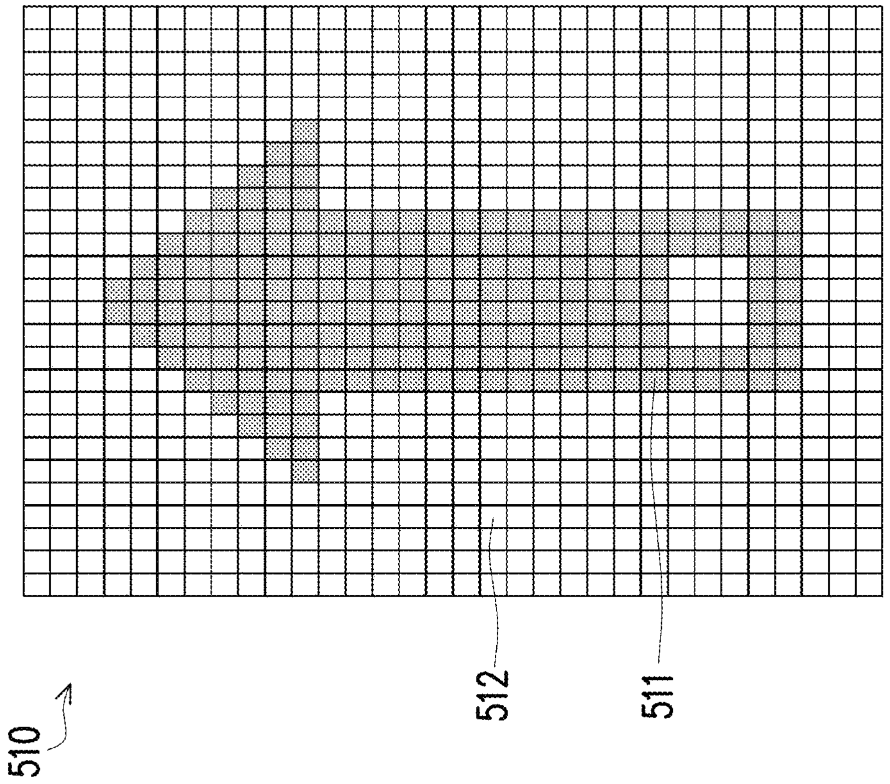
FIG. 5A is a schematic diagram of a time indication image according to an embodiment of the disclosure.

FIG. 5A is a schematic diagram of a time indication image according to an embodiment of the disclosure. FIG. 5B is a schematic diagram of a mask image according to an embodiment of the disclosure. Referring to FIG. 3, FIGS. 5A and 5B, the mask generating unit 313 may generate the mask image 520 as shown in FIG. 5B based on the (scaled) time indication image 510. In the embodiment of the disclosure, the time indication image 510 may include a first region 511 (also called coverage area, which means the image of the first region 511 may cover on the background image) and a second region 512 (called transmissive area, which means the image of the second region 512 may be visually transmissive, and in other words, a part of the background image where the image of second region 512 covers may be seen). The pixels of the first region 511 of the time indication image 510 may have grayscale values within a first grayscale range, and the first region 511 of the time indication image 510 may correspond to the clock hand pattern. The pixels of the second region 512 of the time indication image 510 may have grayscale values within a second grayscale range. In one embodiment of the disclosure, taking pixel data of the time indication image 510 presented by 8-bit grayscale values from 0 to 255 as an example, the first grayscale range may be grayscale values from 0 to 254, and the second grayscale range may be a grayscale value 255, but the disclosure is not limited thereto.

In the embodiment of the disclosure, the mask image 520 may include a first grayscale region 521 and a second grayscale region 522. The mask generating unit 313 may determine the grayscale values of the first grayscale region 521 corresponding to the coverage area according to pixel data of the first region 511 of the time indication image 510, and determine the grayscale values of the second grayscale region 522 corresponding to the transmissive area according to pixel data of the second region 512 of the time indication image 510. The first grayscale region 521 of the mask image 520 may corresponded to the first region 511 of the time indication image 510 having the first grayscale range, and the second grayscale region 522 of the mask image 520 is corresponded to the second region 512 of the time indication image 510 having the second grayscale range. In one embodiment of the disclosure, the grayscale value of first grayscale region 521 of the mask image 520 may be 255, and the grayscale value of second grayscale region 522 of the mask image 520 may be 0, but the disclosure is not limited thereto.

Figure 6A:
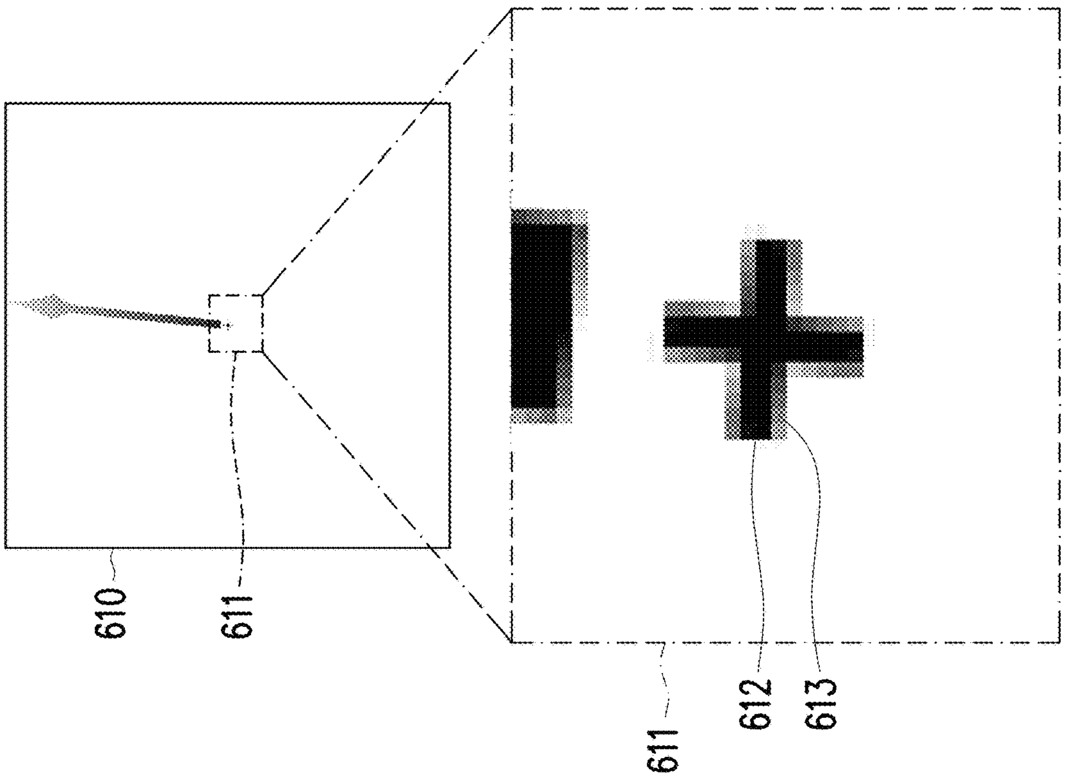
FIG. 6A is a schematic diagram of a rotated time indication image according to an embodiment of the disclosure.
Figure 6B:
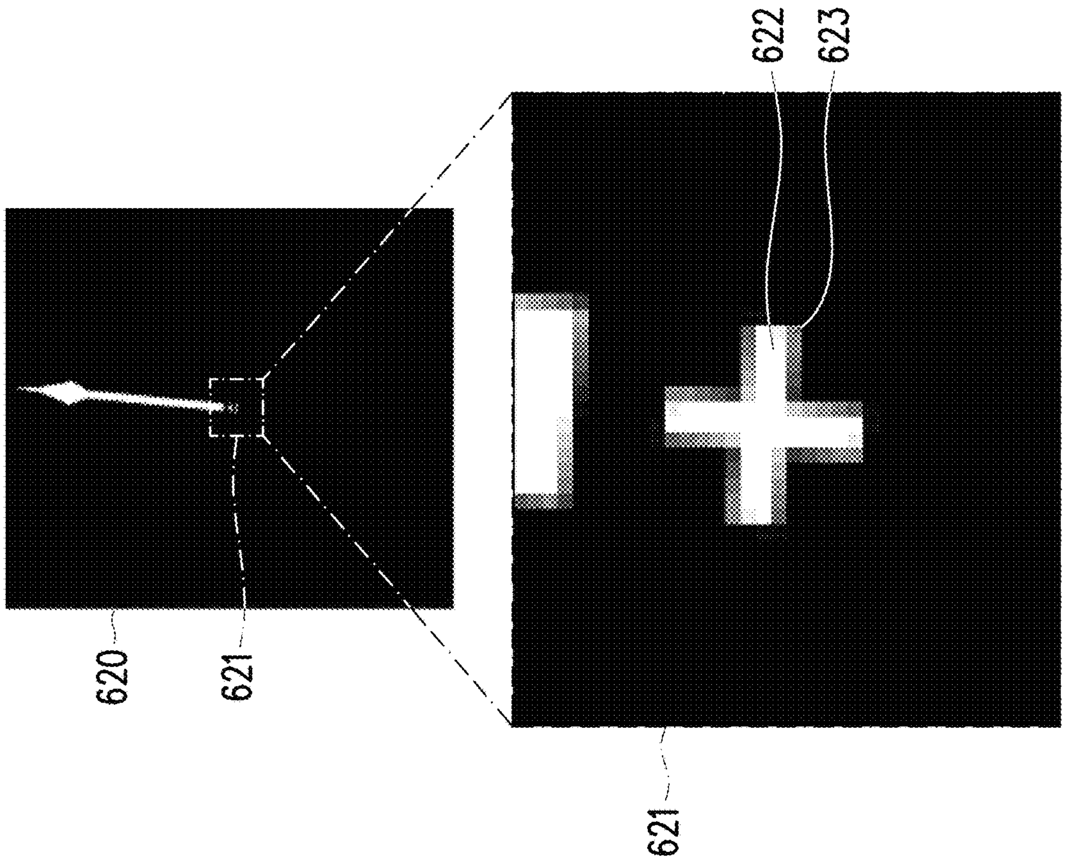
FIG. 6B is a schematic diagram of a rotated mask image according to an embodiment of the disclosure.

FIG. 6A is a schematic diagram of a rotated time indication image according to an embodiment of the disclosure. FIG. 6B is a schematic diagram of a rotated mask image according to an embodiment of the disclosure. Referring to FIG. 3, FIGS. 6A and 6B, the rotating unit 314 may receive the (scaled) time indication image and the mask image from the location arrangement unit 312 and the mask generating unit 313. The rotating unit 314 may rotate the time indication image and the mask image by the rotation angle corresponding to the time information to generate the rotated time indication image 610 as shown in FIG. 6A and the rotated mask image 620 as shown in FIG. 6B. In the embodiment of the disclosure, the image stacking unit 316 may receive the rotated time indication image 610 and the rotated mask image 620. The rotated time indication image 610 may include a coverage area 612, a transmissive area (which occupies the most part of an enlarged area 611) and a gradient area 613, and the rotated mask image 620 also including corresponding areas. The gradient area 613 exists only when the rotating unit exists and performs image rotation.

In the embodiment of the disclosure, the rotating unit 314 may rotate the time indication image and the mask image in a manner corresponding to the original point of the image coordinate system or any coordinate point (for example, the image center or the above-mentioned reference point in the image), but the disclosure is not limited thereto. It should be noted that, as shown the partially enlarged area 611 in FIG. 6A, the grayscale values of the pixels in the gradient area 613 which is a boundary of the clock hand pattern 612 may be various due to image rotation. As shown the partially enlarged area 621 in FIG. 6B, the grayscale values of the pixels in a boundary 623 (as the gradient area) of the coverage area 622 may be changed from the grayscale value 255 to the grayscale values in the grayscale range from 1 to 254 due to image rotation.

The image stacking unit 316 may generate a plurality of first coefficients (x/255) by dividing a plurality of grayscale values (x) of the rotated mask image 620 by a maximum grayscale value (255) respectively, and the image stacking unit 316 may generate a plurality of grayscale values of the output image according to the plurality of first coefficients, the rotated mask image 620 and the rotated time indication image 610. More specifically, the image stacking unit 316 may obtain a plurality of second coefficients (1−(x/255)) by subtract 1 from the plurality of first coefficients (x/255). The image stacking unit 316 multiples the plurality of first coefficients (x/255) by a plurality of grayscale values of the rotated time indication image 610 respectively to obtain a plurality of first values. The image stacking unit 316 multiples the plurality of second coefficients (1−(x/255)) by the plurality of grayscale values of the rotated mask image 620 respectively to obtain a plurality of second values. The image stacking unit 316 adds the plurality of first values and the plurality of second values respectively to generate the plurality of grayscale values of the output image.

Figure 7:
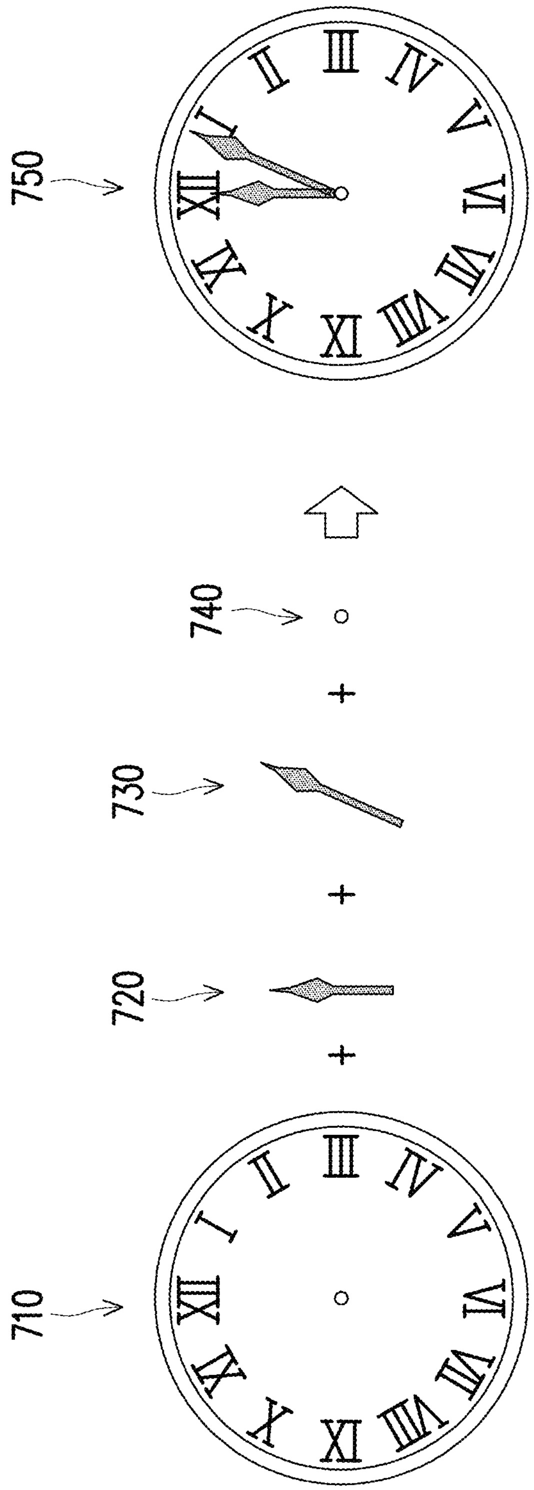
FIG. 7 is a schematic diagram of stacking an output image according to an embodiment of the disclosure.

FIG. 7 is a schematic diagram of stacking an output image according to an embodiment of the disclosure. Referring to FIG. 3 and FIG. 7, in the embodiment of the disclosure, when the central processing unit of the electronic device 30 is operated in the sleep mode or the power saving mode, the image processing circuit 310 may obtain a plurality of original time indication images and one background image from the storage unit 370, the original time indication images may include a hour hand image, a minute hand image, a second hand image, and a hand center image. Then, the image processing circuit 310 may perform at least part of the image scaling process, the location arranging process, the mask generating process, and image rotating process described in the above embodiments to generate the time indication images 710 to 740 as shown in FIG. 7. Finally, the image processing circuit 310 may perform the stacking process described in the above embodiment to stack the time indication images 710 to 740 in sequence to generate the output image 750 as shown in FIG. 7.

Figure 8A:
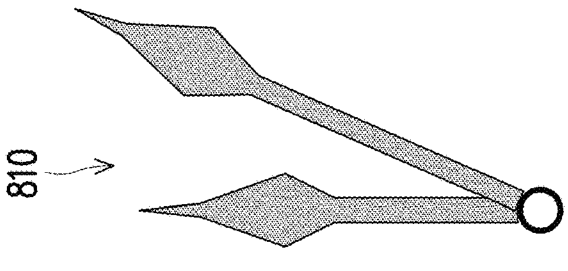
FIG. 8A is a schematic diagram of a rotated and stacked time indication image according to an embodiment of the disclosure.
Figure 8B:
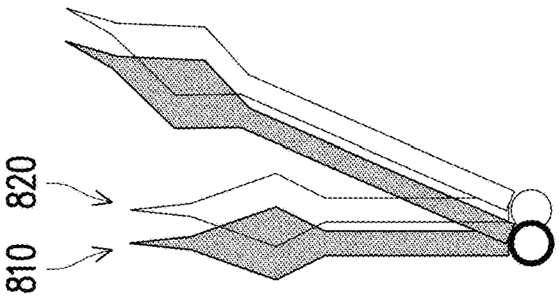
FIG. 8B is a schematic diagram of a rotated and stacked time indication image including a shadow image according to an embodiment of the disclosure.
Figure 8C:
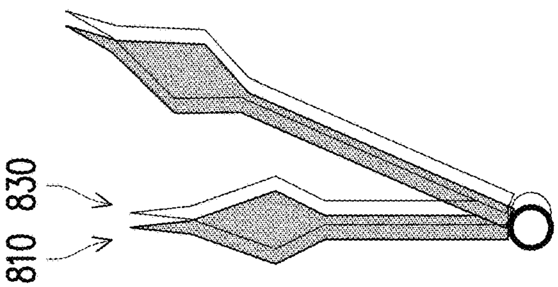
FIG. 8C is a schematic diagram of a rotated and stacked time indication image including a shadow image according to another embodiment of the disclosure.
Figure 8D:
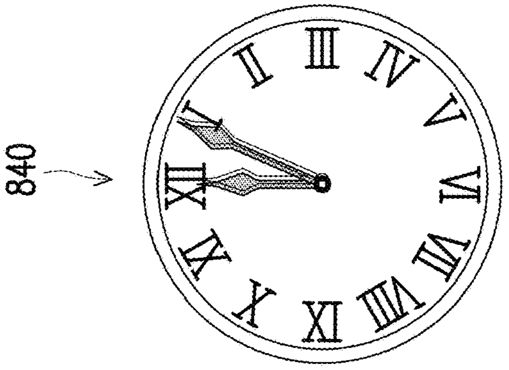
FIG. 8D is a schematic diagram of an output image with special effects according to an embodiment of the disclosure.

FIG. 8A is a schematic diagram of a rotated and stacked time indication image according to an embodiment of the disclosure. FIG. 8B is a schematic diagram of a rotated and stacked time indication image including a shadow image according to an embodiment of the disclosure. FIG. 8C is a schematic diagram of a rotated and stacked time indication image including a shadow image according to another embodiment of the disclosure. FIG. 8D is a schematic diagram of an output image with special effects according to an embodiment of the disclosure. Referring to FIG. 3 and FIG. 8A to 8D, in the embodiment of the disclosure, before the stacking process, the special effect generation unit 315 may receive the time indication image 810 which may be a stack image of the time indication images 710 to 740, and generate the shadow image 820 as shown in FIG. 8B or the shadow image 830 as shown in FIG. 8C output to the image stacking unit 316. In the embodiment of the disclosure, the image stacking unit 316 may determine a transparency of the shadow images 820, 830 according to ambient light information provided by the ambient light sensor 380, and a displacement between the shadow images 820, 830 and the time indication image 810 is determined according to the time information. As shown in FIG. 8B, the transparency of the shadow image 820 may have lower transparency and longer gap between the shadow image 820 and the time indication image 810. As shown in FIG. 8B, the transparency of the shadow image 820 may have higher transparency and shorter gap between the shadow image 820 and the time indication image 810. Therefore, the special effect generation unit 315 may generate the shadow images 820, 830 that mimic actual shadow changes, so that the image processing circuit 310 may generate the more realistic output image 840 with real-time time information by stacking the time indication image 810, background image, and the shadow image (820 or 830).

In summary, according to the display driver integrated circuit and the display driving method of the disclosure, the display driver integrated circuit can effectively generate a clock image with real-time time information by reading images with a lower amount of data from the storage unit, and can effectively reduce the data storage space requirement of the electronic device or the display driver integrated circuit. Moreover, the display driver integrated circuit also can generate a more realistic clock image with shadow effect.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display driver integrated circuit, for driving a display panel of an electronic device, comprising:

an image processing circuit, configured to generate an output image based on time information, a background image, and an original time indication image;

a timing controller, coupled to the image processing circuit, and configured to receive the output image and generate a processed output image; and a data driving circuit, coupled to the timing controller, and configured to receive the processed output image and generate data voltages according to the processed output image, wherein the data driving circuit drives the display panel according to the data voltages, wherein the image processing circuit comprises:

a scaling unit, configured to change an image size of the original time indication image to generate a scaled time indication image;

a location arrangement unit, coupled to the scaling unit, configured to transform coordinates of a reference point in the scaled time indication image which is input to the location arrangement unit to coordinates of an image stacking location in the background image;

a mask generating unit, configured to generate a mask image according to the scaled time indication image which is input to the mask generating unit, wherein the scaled time indication image is different from the mask image;

a rotating unit, coupled to the location arrangement unit and the mask generating unit, and configured to rotate the coordinate transformed scaled time indication image and the mask image by a rotation angle corresponding to the time information to generate a rotated time indication image and a rotated mask image, an image stacking unit, coupled to the location arrangement unit and the mask generating unit, and configured to process the rotated time indication image which is input to the image stacking unit by using the rotated mask image to generate a processed rotated time indication image, and stack the processed rotated time indication image on the background image to generate the output image according to coordinates of the image stacking location, wherein the image stacking unit generates a plurality of first coefficients by dividing a plurality of reference grayscale values of the rotated mask image by a maximum grayscale value respectively, and the image stacking unit generates a plurality of first grayscale values of the output image according to the plurality of first coefficients, the rotated mask image, and the rotated time indication image.

2. The display driver integrated circuit according to the claim 1, further comprising:

a storage unit, coupled to the image processing circuit, and configured to store the at least one original time indication image and the background image, wherein the image processing circuit obtains the original time indication image and the background image from the storage unit.

3. The display driver integrated circuit according to the claim 1, wherein the mask image comprises a first grayscale region and a second grayscale region, and the first grayscale region of the mask image corresponds to a first region of the scaled time indication image having a first grayscale range, and the second grayscale region of the mask image corresponds to a second region of the scaled time indication image having a second grayscale range.

4. The display driver integrated circuit according to the claim 1, wherein the image stacking unit obtains a plurality of second coefficients by subtracting 1 from the plurality of first coefficients, and the image stacking unit multiples the plurality of first coefficients by a plurality of second grayscale values of the rotated time indication image respectively to obtain a plurality of first values, the image stacking unit multiples the plurality of second coefficients by the plurality of reference grayscale values of the rotated mask image respectively to obtain a plurality of second values, wherein the image stacking unit adds the plurality of first values and the plurality of second values respectively to generate the plurality of first grayscale values of the output image.

5. The display driver integrated circuit according to the claim 1, wherein the image processing circuit further comprises:

a special effect generation unit, coupled to the rotating unit and the image stacking unit, and configured to generate a shadow image output to the image stacking unit according to the rotated time indication image, wherein a transparency of the shadow image is determined according to ambient light information, and a displacement between the shadow image and the rotated time indication image is determined according to the time information.

6. The display driver integrated circuit according to the claim 1, wherein the original time indication image is for indicating hour information, minute information or second information, and the background image comprises an analog clock pattern.

7. The display driver integrated circuit according to the claim 1, wherein the image processing circuit receives the time information from a central processing unit of the electronic device.

8. The display driver integrated circuit according to the claim 1, wherein the display driver integrated circuit is coupled to a central processing unit of the electronic device, and the image processing circuit is configured to generate the output image when the central processing unit is operated in a sleep mode or a power saving mode.

9. A display driving method for driving a display panel of an electronic device, comprising:

generating an output image based on time information, a background image, and an original time indication image by an image processing circuit;

receiving the output image and generate a processed output image by a timing controller;

receiving the processed output image by a data driving circuit;

generating data voltages according to the processed output image by the data driving circuit; and driving the display panel according to the data voltages by the data driving circuit, wherein a step of generating the output image comprises:

changing an image size of the original time indication image to generate a scaled time indication image by a scaling unit;

transforming coordinates of a reference point in the scaled time indication image to coordinates of an image stacking location in the background image by a location arrangement unit that is coupled to the scaling unit;

generating a mask image according to the scaled time indication image by a mask generating unit, wherein the scaled time indication image is different from the mask image;

rotating the coordinate transformed scaled time indication image and the mask image by a rotation angle corresponding to the time information to generate a rotated time indication image and a rotated mask image by a rotating unit;

processing the rotated time indication image which is input to an image stacking unit by using the rotated mask image to generate a processed rotated time indication image by the image stacking unit; and stacking the processed rotated time indication image on the background image to generate the output image according to coordinates of the image stacking location by the image stacking unit, wherein a step of generating the output image comprises:

generating a plurality of first coefficients by dividing a plurality of reference grayscale values of the rotated mask image by a maximum grayscale value respectively by the image stacking unit; and generating a plurality of first grayscale values of the output image according to the plurality of first coefficients, the rotated mask image, and the rotated time indication image by the image stacking unit.

10. The display driving method according to the claim 9, further comprising:

obtaining the original time indication image and the background image from a storage unit by the image processing circuit.

11. The display driving method according to the claim 9, wherein the mask image comprises a first grayscale region and a second grayscale region, and the first grayscale region of the mask image corresponds to a first region of the scaled time indication image having a first grayscale range, and the second grayscale region of the mask image corresponds to a second region of the scaled time indication image having a second grayscale range.

12. The display driving method according to the claim 9, wherein a step of generating the plurality of first grayscale values of the output image comprises:

obtaining a plurality of second coefficients by subtracting 1 from the plurality of first coefficients by the image stacking unit;

multiplying the plurality of first coefficients by a plurality of second grayscale values of the rotated time indication image respectively to obtain a plurality of first values by the image stacking unit;

multiplying the plurality of second coefficients by the plurality of reference grayscale values of the rotated mask image respectively to obtain a plurality of second values by the image stacking unit; and adding the plurality of first values to the plurality of second values to generate the plurality of first grayscale values of the output image by the image stacking unit.

13. The display driving method according to the claim 9, wherein the step of generating the output image comprises:

generating a shadow image output to the image stacking unit according to the rotated time indication image by a special effect generation unit, wherein a transparency of the shadow image in determined according to ambient light information, and a displacement between the shadow image and the rotated time indication image is determined according to the time information.

14. The display driving method according to the claim 9, wherein the original time indication image is for indicating hour information, minute information or second information, and the background image comprises an analog clock pattern.

15. The display driving method according to the claim 9, further comprising:

receiving the time information from a central processing unit of the electronic device by the image processing circuit.

16. The display driving method according to the claim 9, wherein the display driver integrated circuit is coupled to a central processing unit of the electronic device, and the image processing circuit is configured to generate the output image when the central processing unit is operated in a sleep mode or a power saving mode.

* * * * *